(No Model.)

A. D. SHELNUTT.
AIR AND WATER FORCING AND EXHAUSTING MACHINE.

No. 302,167. Patented July 15, 1884.

Attest
J. W. Reynolds
Edward E. Ellis

Inventor
Alfred D. Shelnutt
per
O. E. Duffy
Atty

UNITED STATES PATENT OFFICE.

ALFRED D. SHELNUTT, OF ATLANTA, GEORGIA.

AIR AND WATER FORCING AND EXHAUSTING MACHINE.

SPECIFICATION forming part of Letters Patent No. 302,167, dated July 15, 1884.

Application filed August 1, 1883. (No model.)

*To all whom it may concern:*

Be it known that I, ALFRED D. SHELNUTT, of Atlanta, in the county of Fulton and State of Georgia, have invented certain new and useful Improvements in Air and Water Forcing and Exhausting Machines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention is for an improved apparatus for drawing in air or water and again forcing it out to any suitable apparatus, for use in the arts, having for its object the supply of air to grain-mills for cleaning or separating the grain, to houses for heating or ventilating purposes, to mines, wells, &c., either for drawing out the noxious gases or vapors therefrom, or for supplying fresh air thereto, and to carburetors for the admixture of air with fluid for burning purposes, and all such like uses, thus superseding the ordinary fan-blower and similar contrivances heretofore used; also having for its object to provide an apparatus for cleaning the bottoms of wells and sewers by sucking out therefrom the accumulation of soft mud or any light filth or matter, thus cleansing the same, and also for the cleansing of pipes, and many other such like uses, as will be apparent to those skilled in the arts.

To this end my invention consists in the construction of apparatus provided with suitable alternately opening and closing valves and plunger, in combination with suitable discharge-pipes for the air or water; and it consists, also, in the combination of said apparatus and its components with additional pipes, all as when used for the different purposes herein specified, and in the manner substantially as will be hereinafter more particularly described and pointed out.

Figure 1:
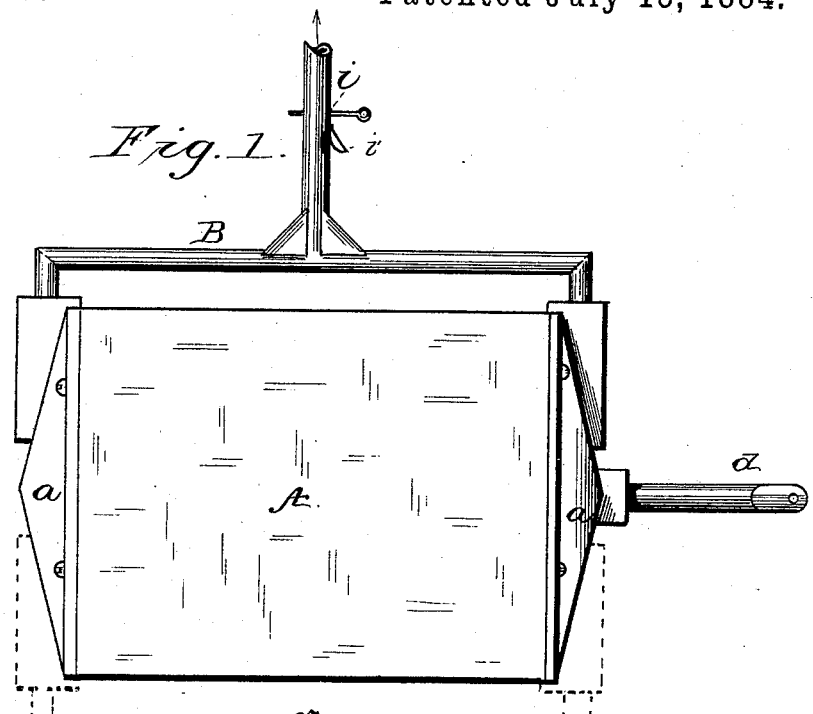
Figure 2:
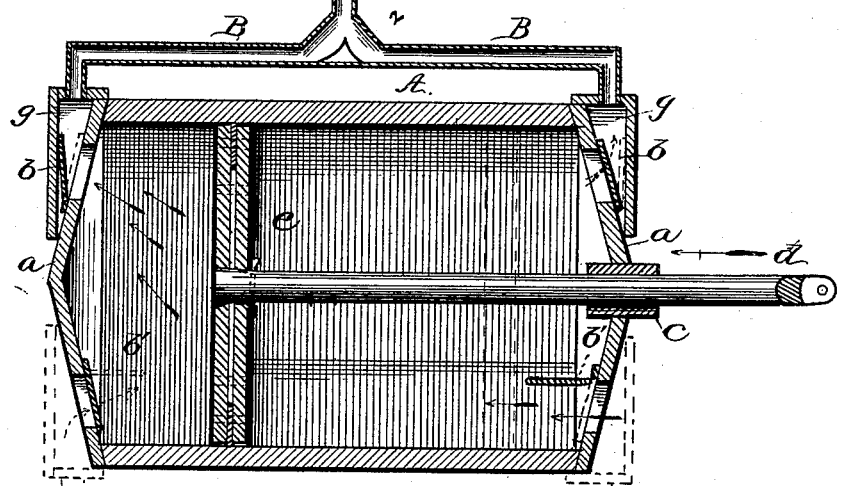

Referring to the drawings, Figure 1 represents a side elevation of my improved apparatus; and Fig. 2, a longitudinal sectional view thereof, clearly showing its working.

Reference being had to the parts by the letters marked thereon, A represents a chamber or cylinder, made of any suitable material, and, as shown in the drawings, is of square bore, although a cylindrical form might be employed. The ends of the cylinder A are provided with a removable head, $a$, each of said heads having an outwardly-opening valve, $b$, and an inwardly-opening valve, $b'$, closing openings in the heads.

Working through a stuffing-box, $c$, in one of the heads $a$ is a rod, $d$, carrying the plunger $e$, which plunger, as it is worked back and forth within the cylinder, causes the valves to alternately open and close, for drawing air into the cylinder and discharging it therefrom simultaneously, as will be explained hereinafter.

Inclosing the outwardly-opening valves on the outer side of the heads are small chambers $q$, having suitable openings therein, by which said outwardly-opening valves at the ends of the cylinder are connected by a pipe or tube, B, having a main branch, B'. This main branch is provided at its extremity or at any portion of its length with a damper, $i$, and a flap or vent-cover, $i'$, to close an opening in the side of said pipe, and at the point of juncture between the inner end of tubes B and the main branch B' the said tubes are bent or curved to form a deflector, 2, for the air as it is discharged alternately into and through the said branch.

By the apparatus as thus constructed, a backward stroke being given the plunger, the inwardly-opening valve $b'$ at the left-hand end is caused to open by the partial suction produced and the external air, while at the same time the outwardly-opening valve $b$ at the opposite end is caused to open by the pressure exerted on the air already contained within the cylinder behind the plunger. Then upon a forward stroke of the plunger the air which had been drawn in through $b'$ at the left hand is forced through the opening of the outwardly-opening valve $b$ at said end, and the pressure at the same time closing $b'$. Upon the forward stroke a partial vacuum is produced behind the plunger, and the pressure of the external air closes valve $b$ at the right hand and opens valve $b'$ at the same end, thus causing the air to rush in.

It will be seen that by rapidly working the plunger the air is alternately discharged through the branches of the connecting-pipe of the outwardly-opening valves, as it is at the same time alternately drawn in through the openings controlled by the inwardly-opening valves, and that it is simultaneous. Air can thus be supplied to any place for use—either to heaters, to grain-mills, to houses for ventilation, or such like purposes.

I have shown, in dotted lines, pipes connecting the inward-opening valves similarly as with the others, by which it is designed, by flexible connections with said pipe or otherwise, to draw off soft mud or filth from wells, sewers, &c., by placing the end of one pipe in the mud at bottom thereof and discharging said mud through the other pipe by the manipulation of the plunger, as above. When simply desired to force air, this additional pipe may be dispensed with. When it is desired to cut off the supply of air, the damper $i$ in the pipe can be closed and the air may escape through the opening in the pipe covered by flap $i'$.

Any sort of power may be applied to the plunger-rod to operate it; and it will be seen that my apparatus possesses many advantages, as water or air can either be drawn from a vessel or supplied thereto, as may be desired.

What I claim is—

An air-engine consisting of the cylinder having removable heads, provided with the inwardly and outwardly opening valves surrounded by the chambers $g$ and the pipes B B, terminating in the branch B', and connecting the chambers of each like valve, said pipes being curved at their junction, whereby is formed the deflector 2, and said branch provided with the damper $i$ and flap $i'$, all substantially as and for the purpose set forth.

In testimony that I claim the foregoing as my own I affix my signature in presence of two witnesses.

ALFRED D. SHELNUTT.

Witnesses:
B. F. MORSELL,
EDWARD E. ELLIS.